(12) United States Patent
Sass et al.

(10) Patent No.: US 8,055,528 B2
(45) Date of Patent: Nov. 8, 2011

(54) SYSTEM AND METHOD FOR INFORMING BUSINESS MANAGEMENT PERSONNEL OF BUSINESS RISK

(75) Inventors: Darwin H. Sass, Herriman, UT (US); Jacob L. Bogedahl, Alpine, UT (US)

(73) Assignee: Browz, LLC, Draper, UT (US)

( * ) Notice: Subject to any disclaimer, the term of this patent is extended or adjusted under 35 U.S.C. 154(b) by 877 days.

(21) Appl. No.: 11/963,600

(22) Filed: Dec. 21, 2007

(65) Prior Publication Data

US 2009/0164276 A1    Jun. 25, 2009

(51) Int. Cl.
*G06Q 10/00* (2006.01)
(52) U.S. Cl. .................................... 705/7.28; 705/7.11
(58) Field of Classification Search ............... 705/7
See application file for complete search history.

(56) References Cited

U.S. PATENT DOCUMENTS

| | | | |
|---|---|---|---|
| 5,765,138 A | 6/1998 | Aycock et al. | |
| 7,693,724 B2 * | 4/2010 | Bryant | 705/315 |
| 2002/0007302 A1 | 1/2002 | Work et al. | |
| 2002/0120558 A1 * | 8/2002 | Reid | 705/38 |
| 2002/0147676 A1 * | 10/2002 | Karmali | 705/38 |
| 2003/0065978 A1 | 4/2003 | Adams | |
| 2003/0083918 A1 | 5/2003 | Hoffman et al. | |
| 2005/0071217 A1 * | 3/2005 | Hoogs et al. | 705/10 |
| 2007/0016542 A1 | 1/2007 | Rosauer et al. | |
| 2007/0050288 A1 * | 3/2007 | Sarkar et al. | 705/38 |
| 2007/0208600 A1 | 9/2007 | Babus et al. | |
| 2007/0260498 A1 * | 11/2007 | Yokota et al. | 705/7 |
| 2009/0024425 A1 * | 1/2009 | Calvert | 705/7 |
| 2009/0030751 A1 * | 1/2009 | Barve et al. | 705/7 |

FOREIGN PATENT DOCUMENTS

| | | |
|---|---|---|
| KR | 2006-0058186 | 5/2006 |
| WO | WO 2006/125274 | 11/2006 |

OTHER PUBLICATIONS

Jerzy Stefanowski, and Szymon Wilk. "Evaluating business credit risk by means of approach-integrating decision rules and case-based learning." International Journal of Intelligent Systems in Accounting, Finance and Management 10.2 (2001): 97. ABI/INFORM Global, ProQuest. Web. Jun. 17, 2011.*
http://www.alachisoft.com/articles.rapidly_develop_gui_with_form_designer.html, Alachisoft,, Rapidly Develop GUI with Forms Designer, accessed Jul. 19, 2007, 6 pages.

* cited by examiner

*Primary Examiner* — Matthew Gart
*Assistant Examiner* — Seye Iwarere
(74) *Attorney, Agent, or Firm* — Thorpe North & Western LLP

(57) ABSTRACT

A system and method are provided for informing business management personnel of business risk. The method can include the operation of defining a plurality of business risk rules that are tied to specific risk events and information. The plurality of business risk rules can be stored in encapsulated data points. Another operation is defining predicate risk rules and core risk rules for the business risk rules in the data points. A query can be made of whether predicate risk rules in a section of data points are satisfied using the predicate risk rule in a core data point. The core risk rules for the core data points can be applied after predicate risk rules for the core risk rule have been satisfied. A further operation is displaying a graphic icon to an end user for core risk rule status representing whether a core risk rule has been satisfied.

22 Claims, 10 Drawing Sheets

FIG. 8

SYSTEM AND METHOD FOR INFORMING BUSINESS MANAGEMENT PERSONNEL OF BUSINESS RISK

BACKGROUND

In today's business marketplace, each ongoing business entity desires to manage the risks and possible losses associated with its business, regardless of the business size. Certainly there are risks associated with operating a smaller business but the risks tend to multiply as the size of a business increases. Not only do the risks increase as the relative size of the business increases but the possibility of loss is also multiplied because of the widespread operations of larger businesses. In fact, some business consultants believe that reducing or avoiding losses can be just as important as working on generating profits.

In addition to managing simple risk and loss, there are many other complex issues in today's business world that complicate the management of risk factors. Of course, there is the possibility of the simple loss of profits or merchandise damage, but there are also government rules and regulations that can apply to businesses. For example, some businesses are at risk that governmental regulators could shut down the business or that large fines could be accrued for misdeeds. In addition to governmental regulation, there is also the risk of loss through litigation or other similar legal means. Other risks that contribute to the overall risk analysis for a business are safety concerns, environmental quality, product quality, product liability, insurance, bonding, employee misdeeds, security clearances, disadvantaged business compliance, and similar risks that can be considered by the operating executives or owners of businesses. Furthermore, there are other extraneous risks that need to be assessed and managed such as acts of nature, explosions, fire, and computer failure.

In the past, businesses and corporations have been able to manage this risk by applying specific policies or training rules to their employees to minimize business risks. These policies and rules have included specific types of training, certifications, management and/or monitoring to avoid identified risks. In addition, companies have been able to purchase insurance to cover their own internal risks.

During recent years, many companies have outsourced various functions to third party suppliers or independent contractors. This shift has occurred in part because of the focus of many companies on their core competencies, as opposed to the vertical integration favored in the past. Unfortunately, it is difficult for a company to directly control the behavior of a supplier or independent contractor. For example, a relationship with a supplier or independent contractor can include an inherent level of risk in the following areas: regulatory compliance, insurance expiration, supply interruptions, citation histories, bonding, financial stability, environmental performance, safety reporting, quality performance, employee testing, security, and licensing. Notwithstanding the difficulty in managing the risk created by using outside suppliers, companies desire to manage the risk because this risk flows back to the customer or company.

A larger company may hire a smaller contractor to do a specific job that has inherent risks. Previously, the company may have had this service provided by its own employees and the employees would have been reasonably trained, tested, and appropriately bonded or insured. However, a small supplier or independent contractor who is providing products or services to a larger company may not take these types of precautions. Then when an accident occurs, the larger company or customer may be liable in litigation for problems or accidents resulting from the services or products.

For instance, a petroleum company may hire a welding supplier to work on the petroleum company's oil pipeline system. This welding supplier may be a small welding company that is locally owned or operated. If this welding company hires a welder who is untrained, uninsured, or has a substance abuse problem, then an accident may occur. The welding accident on the oil pipeline might produce an explosion that kills innocent bystanders. Thus, the petroleum company will almost certainly be named in, and may ultimately be held responsible for the resulting litigation that comes from the entire matter, even though the services were provided by an independent supplier.

When a relationship is formed between a customer company and a supplier, at least one contract is typically signed between them. Larger companies typically require the contract with the supplier to include certain terms, conditions, and compliance with government regulations. The terms, conditions, and applicable regulatory provisions that are included in these contracts are quite detailed and can run into the range of hundreds of pages of contract requirements. Once the supplier has agreed to a set of extensive terms, conditions, and applicable government regulations, the customer company is left in the position of determining whether there is actual compliance with all the provisions.

The typical way in which companies have attempted to determine whether a supplier is in compliance with the terms, conditions, and applicable regulations of the contract is to perform further due diligence and research about compliance. For example, a long form or document with questions may be sent to the supplier and the supplier can be asked to disclose an extensive list of information to the customer. It is not atypical for such a compliance due diligence questionnaire or form to range anywhere from 1 to 100 pages or more. The types of questions the supplier is asked to answer can cover a wide range of areas from the executed contract. These issues can include safety, environmental, product liability, insurance, bonding, and other similar issues.

The supplier sends this extensive survey or form to their own compliance department, which fills out the form in detail and supplies the requested compliance information to the customer. If the supplier does not have a compliance or due diligence staff, then the supplier may employ the valuable time of their management staff, servicing staff or others to reply to these information requests. The research and employee time involved in filling out due diligence surveys for such terms, conditions, and applicable regulations can involve tens or even hundreds of man hours. As can be imagined, this amount of compliance work can incur a significant cost for the supplier.

When the customer receives this due diligence information covering compliance with the contract's terms, conditions, and applicable regulations, then the customer must also spend tens or hundreds of hours in organizing and analyzing this information on the paper form to determine if the information received is appropriate, complete, and accurate. This exercise in due diligence helps the customer to better manage the risk associated with having many suppliers. Otherwise, the contract terms and conditions are merely agreed upon but are not necessarily implemented or supported.

Regrettably, there are a number of disadvantages with the current system. Many companies have found that when there is a problem with a supplier, then the compliance documents for the terms and conditions of the contract are pulled out of a physical archive system and reviewed. What may be found is that much of the original survey information is incomplete, missing, old, or incorrect. Principally, it is difficult to monitor continued compliance during the term of the contract.

The entire process of determining whether or not a supplier conforms to the appropriate terms, conditions, and applicable regulations of a customer's contract is an extremely expensive and time consuming process for a customer company. Regardless of how much time and energy is spent on these due diligence processes, there may be overlooked items or incomplete information which will be later brought forth in litigation, government compliance inspections, or governmental hearings that are to the detriment of the company. Despite the reduced risk provided by human monitoring, the risk is not reduced as much as the customer's executive officers and directors would like because of the gaps and inconsistencies in the compliance process. Indeed, when many company executives have been asked what one of their most serious problems is, they reply that it is managing general risk and supplier risk.

BRIEF DESCRIPTION OF THE DRAWINGS

FIG. 8 illustrates a rules generation window for creating and modifying custom rules;

DETAILED DESCRIPTION

Figure 1A:
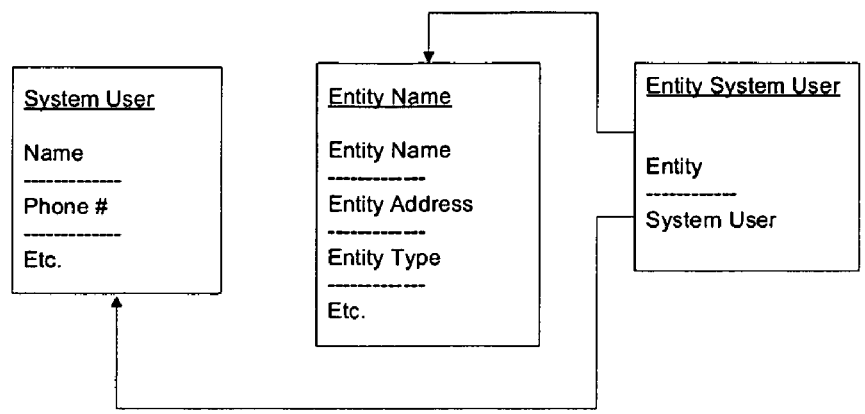
FIG. 1a illustrates an embodiment of a linkage between the two groups of data points.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

In order to manage the risk that has been described, the present system and method provides a robust computing system and method that can significantly aid in managing and reducing risk. The present system can be scaled and flexed in a broad range of areas to accommodate the rapid growth and data distribution required by fast-growing organizations with huge volumes of data. Large organizations demand a system that can deliver in these three specific areas:

The Data Layer (Data Relationships)
Redistribution of Data (Vertical Scaling)
Adding New Data Points (Horizontal Scaling)

The present system and method provides strength and versatility in all three areas. The following discussion describes how a data point catalog system delivers power and performance.

The Data Layer (Data Relationships)

Typical organizations obtain data by selecting from SQL-based servers running on one or more hardware systems. Each database may contain tables and fields holding various pieces of information. The relationship between data values is typically one way. In other words, if Table X contains a foreign key pointing to the primary key in Table Y, that is generally considered a one-way model. The database can figure out how to get from Table X to Table Y, but Table Y cannot get directly back to Table X. This relationship is illustrated in FIG. 1.

An additional limitation of the SQL model is the inability to shift data values (or tables) from one server system to another and maintain the relationships of foreign to primary keys. This limitation severely affects the scalability of SQL servers.

The data model of the present invention has developed a Data Point Catalog system. The data point system consists of a catalog portion of a data point and an instance portion of a data point. The physical hardware location of the data points becomes less relevant as long as the Data Point Catalog can return the location of desired data points for a query.

An analogy for this relationship is the ISBN numbering system of publications. There is only one ISBN catalog portion (i.e. the number, description, author, etc.). But there are multiple "instances" of the book. Information about a data point that is not instance based is contained in the catalog. For example, non-instance based information can include information such as: the location of the instance data for that data point, the data type, and default values, etc. Data for specific instances of data points (i.e. a user) can be stored in the instance area.

There may be four types of data points: Group, Attribute, Reference, and Calculated. A group data point contains subordinate data points. Groups are similar to tables in SQL database systems, but groups contain a broad range of mechanisms for versioning and for change control. All other data points fall under groups, and the group is responsible for storage and retrieval of all its subordinate data points.

An attribute data point holds values such as numbers, text, dates, and so forth. A reference data point points to other groups, enabling relationships between data. A calculated data point acts as an attribute, but obtains data live from other data points. A calculated data point is effectually a virtual data point, because the data is calculated live, but it also has the ability to interact as attribute points do.

Each data point has a catalog portion, which contains detailed information to determine its location. Group data points track which Reference data points refer back to the group. This bi-directional communication path enhances data tracking, auto-removal, and auto-notifications. These mechanisms allow data points to take care of themselves and their relationships with other data points.

A number of examples that can aid in understanding the nature of data points will now be discussed. In FIG. 1a, the group data point "SystemUser" contains Attribute data points that each hold values related to a user, such as name, phone, and so forth. The group data point "Entity" contains Attribute data points that each hold values related to a business entity (company), such as Name, Address, Entity Type (corporation, LLC, sole proprietorship, etc.).

To create a many-to-many relationships between the "System User" and "Entity" (in other words, one system user can belong to more than one entity and vice-versa), a new group data point called "EntitySystemUser" can be created. This new group data point is also illustrated in FIG. 1a. It contains two Reference data points. One points to the "Entity" group, one points to the "SystemUser" group.

Figure 1B:
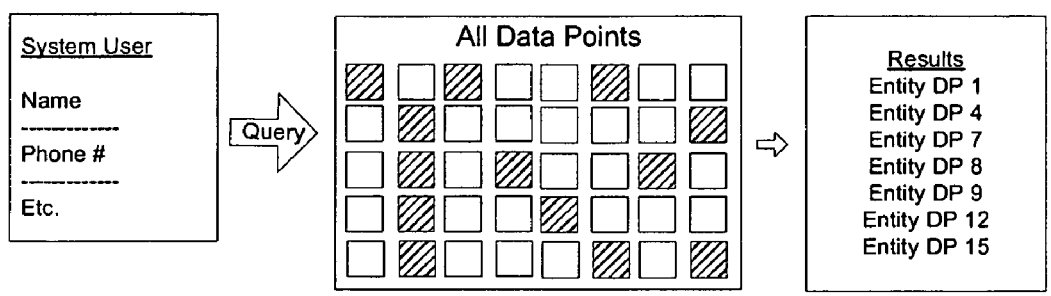
FIG. 1b illustrates an embodiment of a query of data points.

If there is an instance of a "SystemUser", a search query can be initiated within the data point for all "Entity" group data points to which it belongs. The group data point "SystemUser" contains the information needed to point it to "Entity" via "EntitySystemUser" and the dual Reference data points. No custom code is required to bring the relationship together because it is part of the code that implements the model. From this query, a list of all "Entity" data points will be returned. FIG. 1b illustrates such a query.

Using the same example above, a "SystemUser" can be removed from the system using a process called Archive. The "EntitySystemUser" embeds a request in the "SystemUser" data point to send a notification when it is archived. When the system user is archived, a message is sent to "EntitySystemUser" stating that the "SystemUser" to which it is pointing has been archived. Upon receiving this information, the "EntitySystemUser" record for that System User is also archived. Again, no custom code is required.

Figure 3:
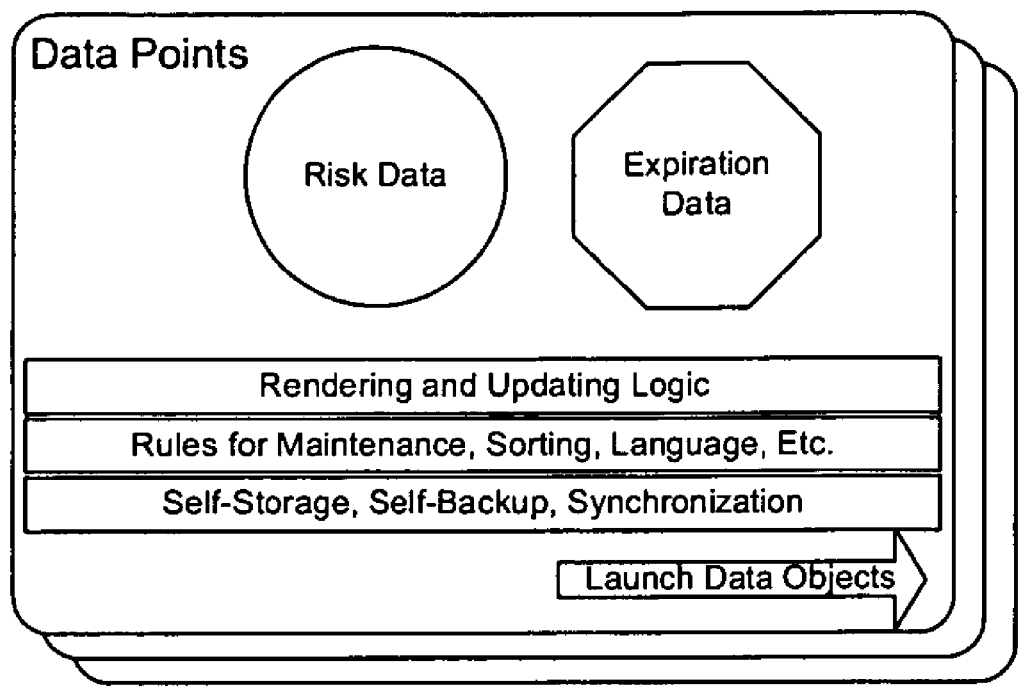
FIG. 3 illustrates an embodiment of a data point with risk data, expiration data and related logic.

FIG. 3 illustrates an embodiment of a plurality of data points. Each data point can contain data that is used by applications. In one configuration, the data represents potential risk for an organization. Expiration data can also be included for the risk data. This expiration data can be a date or length of time before the data point will expire. The system can periodically check when data points are going to expire within the system and report the approaching expiration to end users.

Data points can also contain certain rules and code relating directly to itself. For example, rendering logic can be provided for rendering the data point itself. This means that each data point knows what type of data it is carrying and how the data may be displayed within a graphical user interface (such as a web browser). Other rules can be provided for maintaining, sorting, garbage collection, language enablement and similar functions. Another example of functions that a data point may contain includes self-storage location and formatting, self-backup and synchronization. In addition, each data point can contain information to initiate other data points or groups of data points.

The redistribution of data or vertical scaling will now be discussed. Redistributions may be needed because each individual database can become too large to handle the load. Since a system can rarely anticipate where the exact overload will appear, vertical redistribution has to be adjusted dynamically. Because of the Data Point Catalog and the fact that each data point contains information that relays its location, it is possible to move data points to reside on a new machine that can better handle the load. Using this architecture, no other code or "forwarding of address" has to be made. Any future requests for the data points will work, because the only location where the data resides is in the individual data points.

Figure 2:
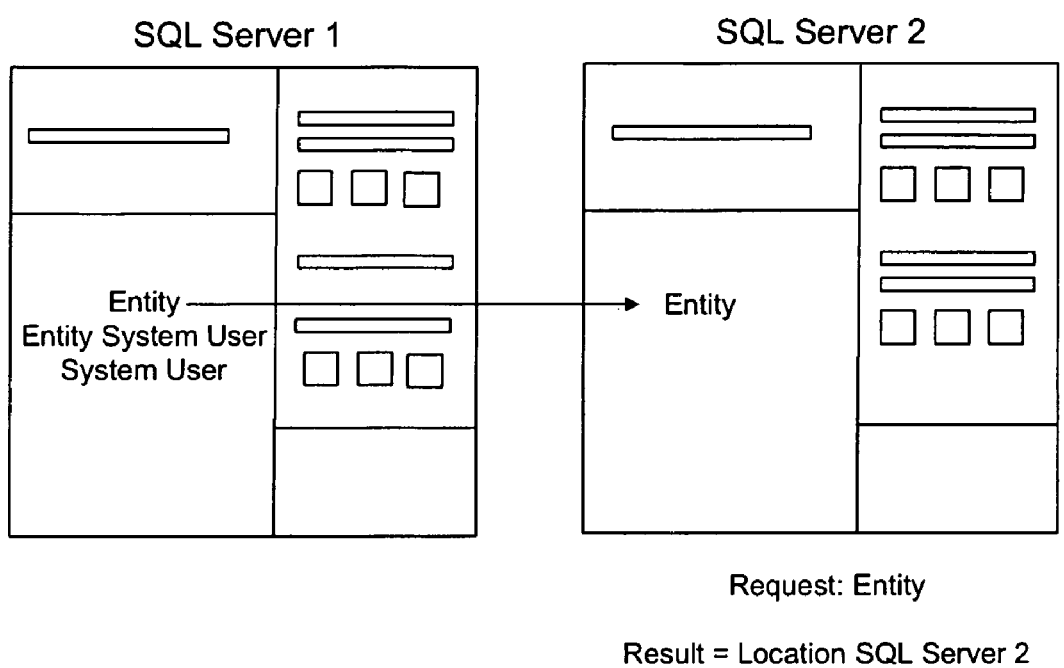
FIG. 2 illustrates a possible embodiment of horizontal scaling of data point storage.

Referring back to the previous "SystemUser" example, imagine that all three group data points ("Entity", "EntitySystemUser", and "SystemUser") reside on one computer running SQL server. As the company grows, the server can no longer handle the load. After careful research, it is discovered that "Entity" is carrying a far greater processing load than the other two group data points. A new server is added and "Entity" is moved to the new server. FIG. 2 illustrates that "Entity" now points to the new machine, and when any future request for "Entity" is made, the query points to the right location, because the location information resides in the catalog portion of the data point itself.

The further challenge behind any major data modeling system is the ability to add new elements or types of data. For example, information storage representing a new industry category may be desired. In the past, new software coding has been necessary to enable this process. In the data point catalog system, the catalog portion of the new data point is easily added to a data point to accomplish the task. A data expansion engine was developed for this system, which allows the system to automatically adopt a new data point and let users add, edit, and remove new instances as desired. This data expansion engine eliminates the need to recode and retool each time a new set of elements are added. This horizontal scaling is valuable for rapid customer deployment and safer implementations since no additional coding is involved. These additions can be performed in bulk, such as adding the entire medical industry, while also adding the chemical industry at the same time. There is no need to wait for shared or related components to be completed.

Along with the features described above, the Data Point Catalog system provides several other features and elements that make the system easy to use and more manageable for long-term scalability.

Each data point has a self-determined data storage mechanism. An additional feature of the data point catalog system is that each data point determines the mechanism for its own data storage. If a data point is an image for example, it can choose to reside on a normal file system. If a data point is an item that requires queries, it may choose to reside in a SQL system. This aspect of the data points can be called "self-storage."

Another powerful feature is that data points are arranged under "data stores." Interrelated data points are typically located in the same data store. This enhances the data points' performance and allows all related data points to be moved at once. For example, it is possible to move a single data point from one data store to another data store, and it is also possible to move an entire data store from one computing system to another one.

Each data point contains enough information to enable it to render its input and output. Meaning, if the data point data is a date, the data point knows to use the calendar control on input and to output the date as text. A data point that holds data of currency type will interpret currency values, and so forth.

Figure 4:
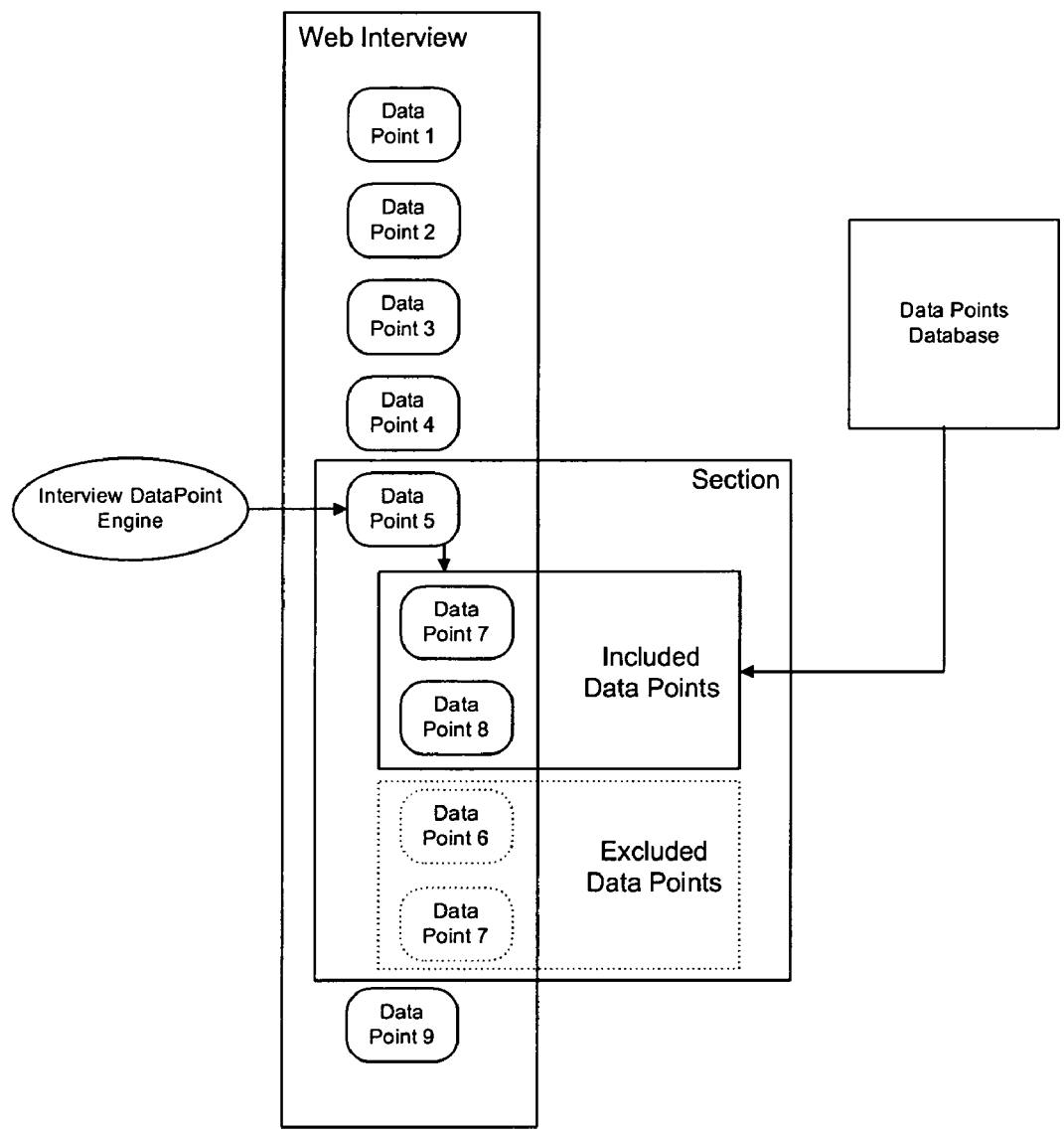
FIG. 4 illustrates an embodiment of an interview data point engine traversing

FIG. 4 illustrates an interview data point engine as it traversing through multiple data points. The interview data point engine will activate the data points to self-render themselves in the web environment or windowing environment within which they are being displayed. Each data point can be checked to see if additional data points should be included into the interview. This checking can be a conditional check that determines whether specific data conditions have been met for the data point which will trigger the inclusion of additional data points. Alternatively, some data points may trigger each other unconditionally.

Rule Control System

Figure 5:
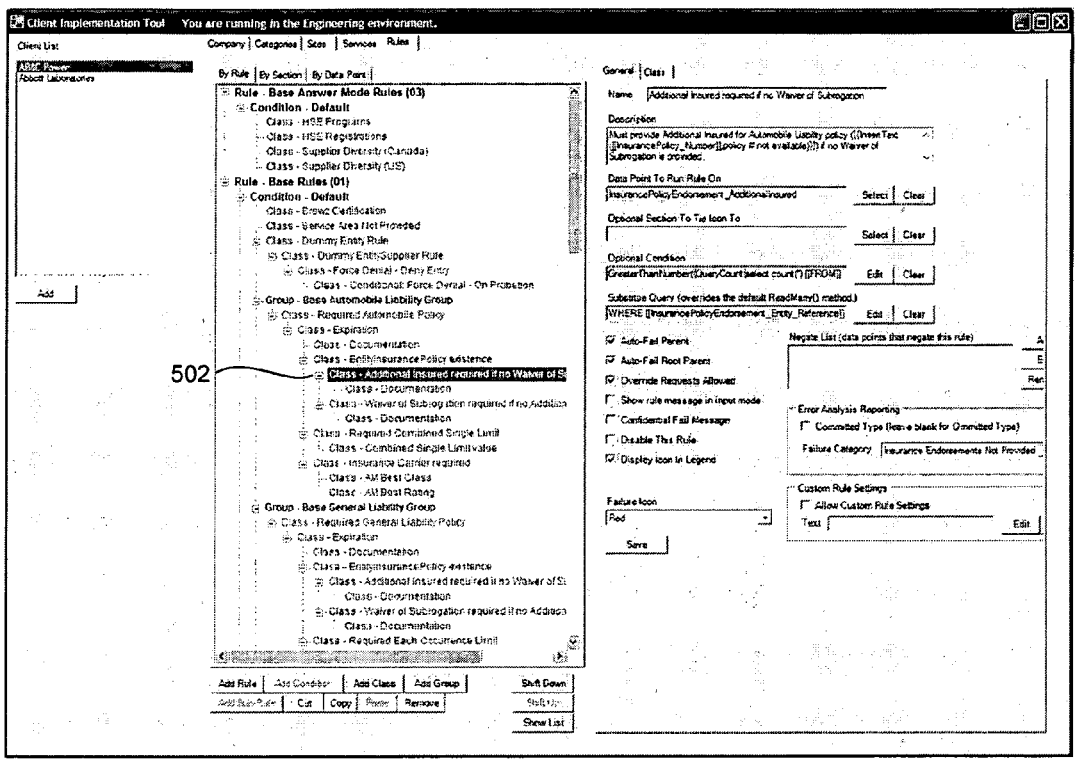
FIG. 5 is a screen shot illustrating a user interface for the hierarchical risk rules.

A method is provided for informing business management personnel of business risk, as illustrated by the screen shot of hierarchical risk rules in FIG. 5. The method can include the operation of defining a plurality of business risk rules 502 that are tied to specific risk events and information. These business risk rules are frequently jointly developed by a customer and the system administrator. For example, the rule called out by 502 illustrates that a business is required to supply additional insured parties if their insurance contract has a "waiver of subrogation". In other words, if the covered company cannot transfer the insurance rights to other involved parties, then those parties need to be added to the insurance policy.

The business risk rules may be stored in encapsulated data points as defined previously. The data points and the rules they contain can be grouped together based on defined areas of risk. Next, predicate risk rules and core risk rules can be defined for the business risk rules in the data points. This creates two sets of rules. The core risk rules will test the basic business rules that are defined by a client and a set of predicate rules can be defined for each basic business rule.

An example of a core business rule is where the total yearly hours worked by an independent contractor is required by the customer. The predicate rule can first check to see whether the previous year's data exists before the core business rule is executed. Predicate rules can generally check for data availability so the core risk rules can run.

The system can then query to determine whether the predicate risk rules in a section of data points are satisfied for a core data point. After all of the predicate risk rules for the core risk rule have been satisfied then the core risk rules stored in the core data points can be executed.

Another example of a predicate risk rule will now be discussed for illustration purposes. If the core risk rule requires that the service provider needs one million dollars of auto liability, this presumes several predicate risk rules that should first be checked. One predicate risk rule may check to see if the service provider has an auto liability policy that is entered into the system. If the liability policy has not been entered yet, then the system will indicate to the service provider's client that the service provider is not fully compliant with all requirements and show which area(s) the service provider is deficient. The client may then request that the service provider update their information. Other predicate risk rules can also be executed to see if the service provider has submitted supporting documentation. Examples of such predicate risk rules may be: whether the insurance contract needs additional endorsements, whether any combined insurance limits have been provided, and who the issuer of the insurance is.

Figure 6:
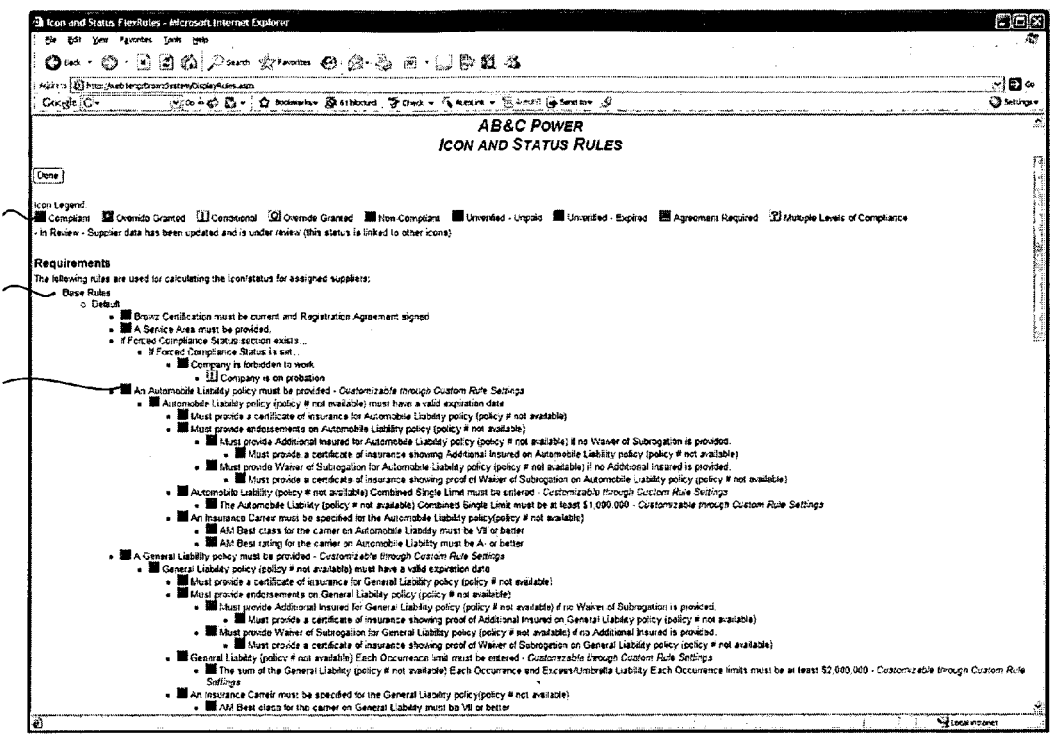
FIG. 6 illustrates a screen shot of listing of risk rules that have status icons.

A further operation is displaying a graphic icon to an end user for a core risk rule status representing whether or not a core risk rule has been satisfied. FIG. 6 illustrates a screen shot of listing of risk rules 604 each with their own status icons. The screen also has a legend 602 showing that the graphic icons can have several different statuses. A failure icon 606 can be shown when a rule fails. The software system can report the core risk rule status to the predicate data point and display a failure icon at higher levels in the hierarchy when any of the core risk rules or the predicate risk rules are not satisfied.

As mentioned before, the predicate risk rules can check to determine whether the specific data items exist for core risk rules to operate on before the core risk rule executes. If the desired data records do not even exist for the core risk rule, the core risk rule execution can be deactivated. Separating rules to check for the existence of data also helps end users know that some rules are failing not because there is an actual risk problem with the service supplier but because there is missing data that is needed to make the evaluation.

In the event that the predicate risk rules fails for lack of data, the software system may be set to the default of presenting the end user with the option to enter the data to satisfy the predicate rule. For example, the end user may be the service provider or client. This may include presenting a user interface with a form to allow the data to be entered. If the data is entered by the end user or system operator immediately, then the next predicate rule or core risk rule may proceed to execute.

When a predicate rules fails, then an icon can be generated. The purpose of the predicate rules is to assure that all of the data required by a core rule is in place and available before the core rule executes. If insufficient data is provided for a core rule to execute, then the supplier is out of compliance and the predicate rule will fail. A predicate rule failure can be passed up to a parent node so that it can be reported to the client.

Rule suppression can also be provided in certain instances in the rule system. In one situation, if a predicate rule fails, then the dependent predicate and core rules lower in the hierarchical branch are suppressed (or not executed) since the system already has determined that the core rule cannot be satisfied due to the earlier failure. In another situation, a client may want a system administrator or system developer to remove a rule from the system. Since it is possible that the rule may be later re-instated by the client, then the system administrator can "turn off" that rule without removing it. Of course, later on the rule may be turned back on when it is needed again.

In another embodiment, a client can customize rules in a rule hierarchy based on a contract with a service provider. If a new contract is awarded to a supplier but the contract does not require the same level of compliance as is required of all of the other suppliers, then the client can alter or suppress some predetermined sets of rules pertaining only to the work performed under that contract. This means the system will generate another set of compliance icons particular to that contract. In addition, insurance policies that are issued specifically for a certain contract are only evaluated relative to the contract terms, as opposed to being evaluated against all insurance rules regardless of the contract even though the contract may not satisfy rules of a general nature.

The predicate rules can also be overridden when a user for the client organization desires to deactivate the rule, regardless of the reason for deactivating the rule. These manual overrides can be passed up to the parents and/or to the appropriate level of the tree. The result is that a manually overridden rule will not contribute to the success or failure result for a group of core risk rules. Manual overrides can be revoked when a re-calculation of the core risk rule, predicate risk rule, or related data points takes place. In other words, when new data is entered into or calculated for a data point, this retriggers the rules and that causes the rule suppression to be erased for the child rules and the parent rules.

Manual overrides for a predicate rule will usually be applied after the predicate rules have been calculated. For example, a client may require that all of their suppliers have an EMR rating (Experience Modification Rate) of 1.0 or less. However, a particularly important supplier may have an EMR rating of 1.02 and will have a red icon for failing to meet that requirement. The supplier cannot do anything to change their rating, but the client may choose to allow them to work anyway and can override the red icon by changing it to a green icon. The rule system still recognizes the failure but also recognizes that the client has overridden the failure, in which case the system may generate a green icon with an O or some similar marker indicating to the client that the supplier has a failure that has been overridden. Since the failure has been overridden, the failure is not communicated to parent rule nodes.

Enabling the manual override of individual rules provides a powerful tool for the client. The clients can check individual rules for a service supplier and if the client wants to override a rule for business reasons, then the rules can be overridden individually. This allows the client to know which rules have been manually overridden, as opposed to having the client override an entire client rule group.

As illustrated by FIG. 6, the rules are organized in a hierarchy 604. If a rule in the hierarchy fails, then this failure may be communicated to the parent nodes or rules using the default rule configuration. The failures that are communicated to the parents may be captured as a failure in the root rule node that is reported to the end user. Specifically, a root predicate risk rule can be enabled to check the status of all dependent core risk rules in a tree hierarchy. The root predicate rule may display a failed icon if any one of the icons in the tree hierarchy has been set to failure status. This high level view of failed rules is valuable because if a supplier to a company fails on any account then there is risk to the company who employs the supplier and that risk should be investigated so it may be mitigated.

While the default setting for each rule is to pass the failure up to parent nodes, the rules can be individually configured not to pass the failure up to parent rules or up to the top of the rule tree. As a specific example, some rules may pertain to individual employee certifications. If a single employee's certificate expires, that employee's rule should fail and can have a red icon. However, a rule failure for the individual employee's certification should not create a failure for the entire rule tree (i.e., the entire service provider company).

The graphic icon 606 can display a status to an end user representing several different level groupings. The level the graphic icon can represent is whether an individual rule has failed. In addition, a status icon can be provided for a data section header representing the status of a group of core data rules as divided into a specific category topic. Another level that a graphic icon can represent is whether the core data rules in an entire rule hierarchy has been satisfied.

The system can apply different sets of rule hierarchies to a supplier company based on how the client categorizes a supplier. For example, a client may categorize each supplier as a high risk, medium risk or low risk. Each risk level or category may have a different set of compliance requirements resulting in a different hierarchy of rules being applied to the supplier. When a client enables a category for a supplier, then the appropriate rule hierarchy tree is enabled based on the supplier's risk level. In addition, a client can apply more than one category to the supplier thereby enabling multiple rule hierarchies on the supplier.

In such cases, the system may have calculated multiple states of compliance. For example, a supplier may have been categorized as High risk and Medium risk (which would be based on the fact that the supplier performs several levels of service). It is possible that the supplier fails the High risk rule hierarchy but passes the Medium risk rule hierarchy. But the system doesn't know what rule result it should display. The client user is given the option of selecting which result they wish to view.

Figure 7:
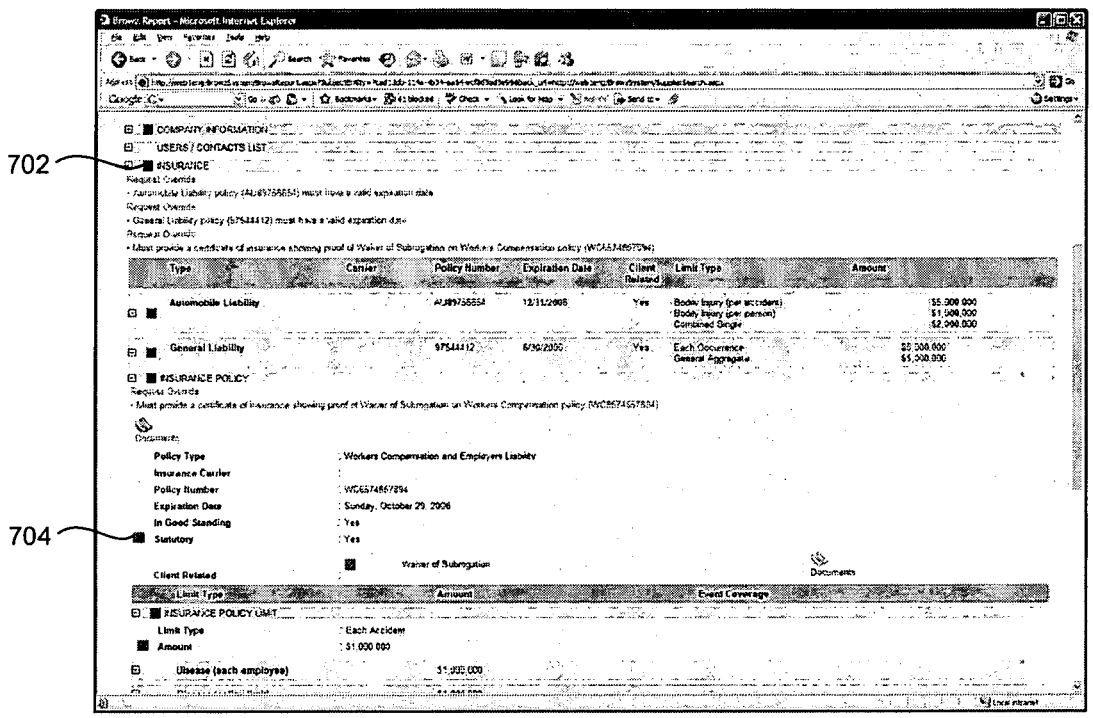
FIG. 7 illustrates risk rules that have status icons and associated rule elements.

FIG. 7 illustrates risk rules 704 and risk rule groupings 702 that have status icons and/or several rule elements listed below them. The parent grouping item 702 illustrates that a status icon can be shown for a topical group. This illustrates that if one rule or object below a grouping fails then the whole group fails. Users are then able to easily discern which areas of risk should be further investigated to reduce the risk of the company. In contrast, an individual item 704 can show a status icon for a single rule (e.g., such as whether the insurance policy is statutory). Each risk area or grouping can have its own set of icons representing problems specific the risk area.

Figure 8:
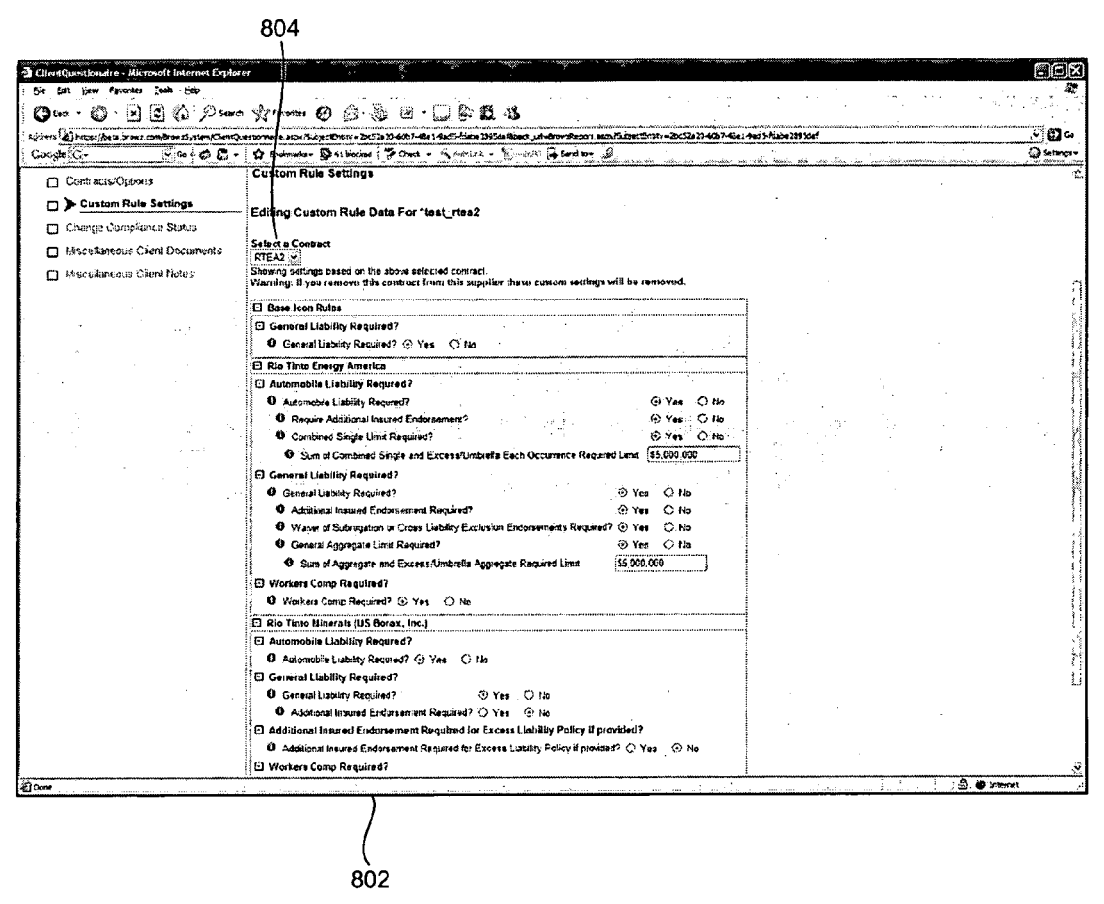

FIG. 8 illustrates a rules generation window 802 for creating and modifying custom rules. The custom rule may have been created by a system administrator and then a user of a client company may come back later and change the custom rule settings to match the changing risk requirements of the company. For example, the screen shown can allow a user to modify insurance amounts and the insurance requirements. This custom rule functionality can be enabled after a contract is entered into the system for that supplier. This screen allows a user "Select a Contract" 804 in order to access the custom rule functionality.

Figure 9:
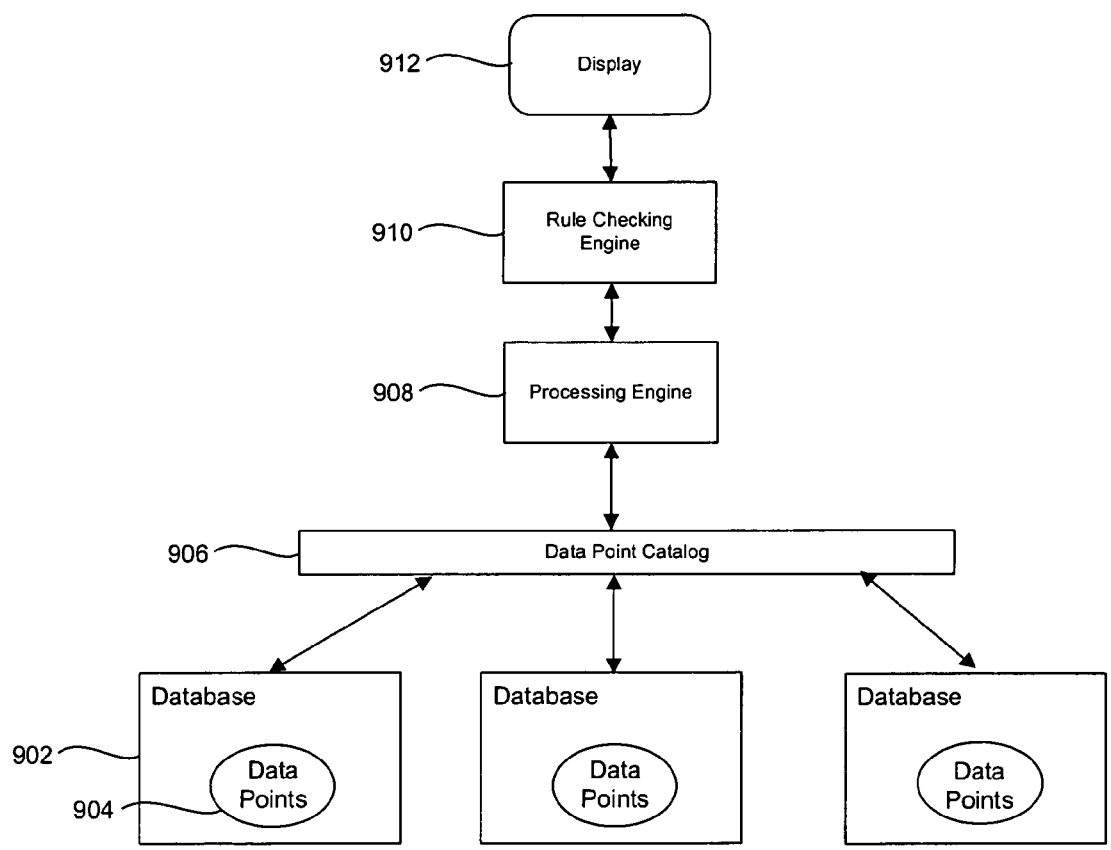
FIG. 9 is a block diagram of a system configured for containing and processing data points.

A block diagram of a system configured for containing and processing data points is illustrated in FIG. 9. The system can include a plurality of data points 904 having self-contained storage, rendering and updating logic. The operation of these data points was described previously and the data points can include a rule or store data.

A plurality of databases 902 can be provided for storing and accessing the plurality of data points. A data point catalog 906 can have reference information about where the data points are located the plurality of databases. For example, the databases and data points can be distributed over a number of servers. As a result, the data point catalog will reference where the needed databases and data points are. In addition, the data point catalog itself may be distributed over a number of servers as needed.

A processing engine 908 can be provided for processing data points. The processing engine is configured to retrieve data points from the data point catalog in order to enable the data to be processed. Associated with the processing engine is a rule checking engine. The rule checking engine 910 can be configured to apply predicate data rules and core data rules to the data points. The results of processing the rules can then be displayed to an end user 912.

Figure 10:
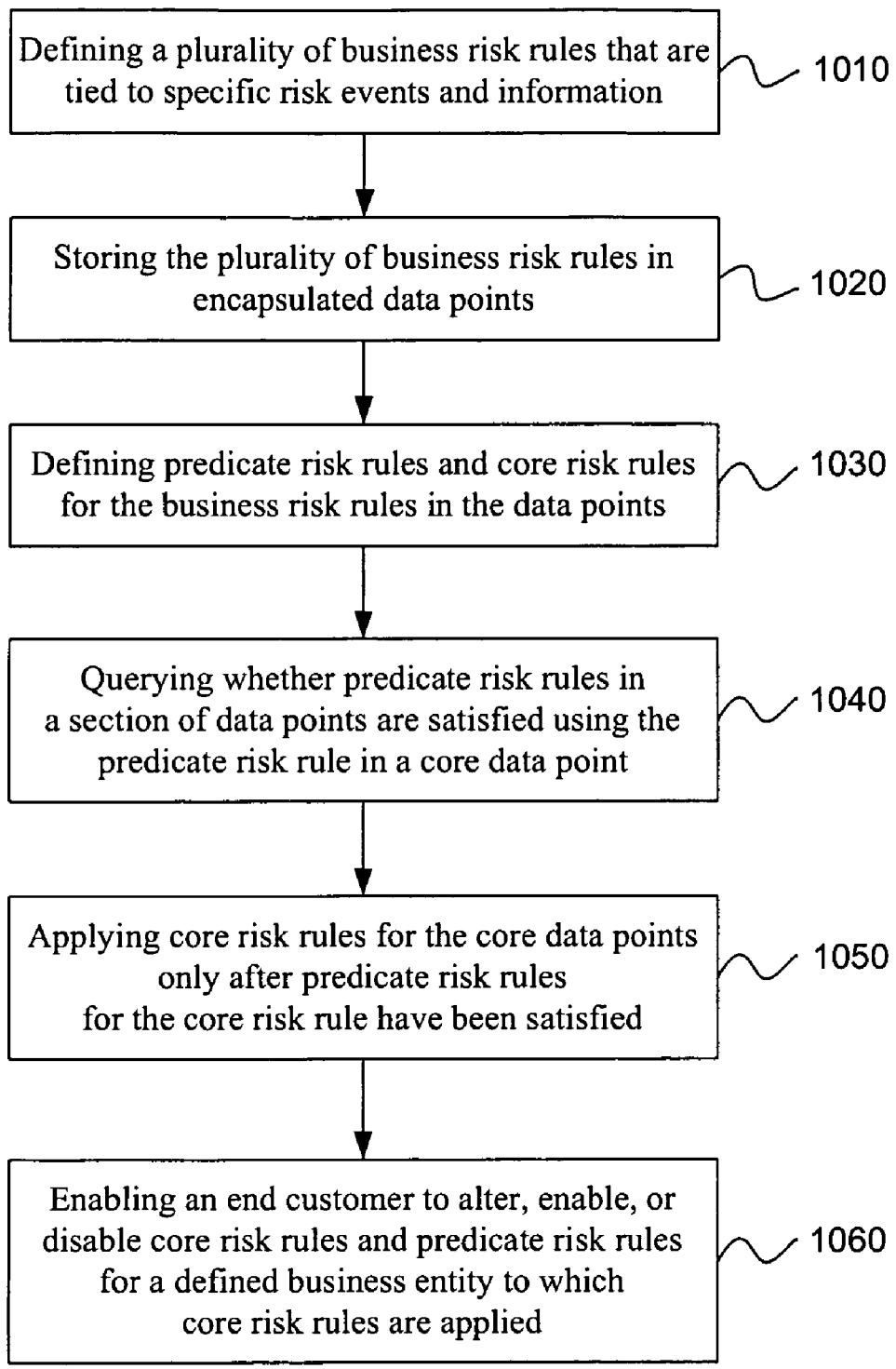
FIG. 10 is a flow chart illustrating a method for informing business management personnel of business risk.

FIG. 10 illustrates and summarizes a method for informing business management personnel of business risk an embodiment of the present invention. The method can include the operation of defining a plurality of business risk rules that are tied to specific risk events and information. The business risk rules can be defined by the business management of the company managing their risk, as in block 1010. The plurality of business risk rules can be stored in encapsulated data points, as in block 1020.

Each of the business risk rules can be broken down into predicate risk rules and core risk rules for the business risk rules in the data points, as in block 1030. This is because each actual business rule can have may have certain pre-requisites that need to exist or pass before the core risk rule can be applied to the business data. The system can query to find out whether predicate risk rules in a section of data points are satisfied based on the predicate risk rule for a core data point, as in block 1040. If the predicate risk rules have been satisfied, then the core risk rules can be applied for the core data points, as in block 1050.

There are situations where the end user desires to alter, disable, or enable the core risk rules and predicate risk rules pertaining to a contract issued to a business entity to which core risk rules are applied as illustrated in block 1060. Custom rule settings allow a client to modify the default rules for a single supplier based on the contract issued to the supplier. The system can generate a separate rule hierarchy for the supplier's contract. The default rules will still apply to the supplier generally but a separate result can be calculated for the contract based on the modified rule set. In order to maintain the data integrity of the rule hierarchy, the disabling of any core risk rule can trigger the disabling of predicate risk rules in the rule hierarchy. This avoids the firing of unnecessary rules which can consume processing resources.

The predicate risk rules may have one or more alternate core risk rules that can be executed depending on the outcome of a predicate risk rule. This way if the predicate risk rule makes a determination that certain pieces of data exist but others do not, then a rule matching the existing data can be fired. Predicate risk rules can also be configured to execute a group of core risk rules if the base predicate risk rule is satisfied. This enables the system to provide granularity in the execution of the rules.

In some situations, a data point may be loaded with new data or a calculation can take place that changes the data in the data point. In this situation, the rule overrides and rule statuses can be reset. Then a cascading re-calculation of all predicate risk rules and core risk rules may take place so that the status data is current.

Another example of a rule in the rule hierarchy will now be described. The rule system can calculate rules based on the hierarchy of the data in the data point system. For example: a supplier and the supplier's identifying information can be the top level. The suppliers' insurance policies may be subordinate to the supplier information. Insurance limits can be subordinate to the insurance policies. The rules may follow the same natural hierarchy. If a core risk rule specifies that a GL (general liability) policy must have a minimum "Each Occurrence" limit of $2,000,000, there are several implied predicate rules. The implied predicate rules and the core risk rule itself may be as follows, in their natural hierarchy:

A supplier must have GL insurance
The GL Insurance must be current
The GL insurance must have an Each Occurrence limit
The Each Occurrence limit must be a minimum of $2,000,000

As the rule system evaluates each rule in the hierarchy, the predicate rule can pass its own data to the next rule down in the hierarchy. This way the subordinate rule knows exactly which data point it is operating under.

Three types of Rule Grouping classes will be created—"And", "Or", and "Insurance" group classes. An "And" grouping class is the default. The "And" grouping of rules means that every rule in the group must be satisfied. An "Or" grouping class allows for any single rule in the group to satisfy a requirement. An "Insurance" grouping class will apply all the member rules to each policy of the type specified in the primary parent member rule. If any single policy satisfies all the member rules, any other policy of the same type will be ignored.

A grouping class will allow a subordinate rule to a predicate rule or parent grouping. A grouping class can also be a predicate rule to a subordinate rule or subordinate grouping. The system may allow one message to be specified for a rule that is generated when an associated data point does not comply with the rule.

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred embodiment(s) of the invention, it will be apparent to those of ordinary skill in the art that numerous modifications can be made without departing from the principles and concepts of the invention as set forth herein.

The invention claimed is:

1. A method for informing business management personnel of business risk, comprising the steps of:
    defining at least one business risk area that is tied to a specific event;
    storing the business risk areas and specific events in encapsulated data points;
    defining predicate data rules and core data rules for data points stored in a database;
    querying with a processing engine regarding whether defined data exists for at least one data point in a section of data points using the predicate data rules;
    applying core data rules to the core data points using a rule checking engine, when defined data exists for data points in a section of data points, to determine whether the core data rules have been satisfied; and
    displaying a graphic icon for a status to an end user representing whether a group of core data rules in a rule hierarchy has been satisfied.

2. A method as in claim 1, further comprising the step of enabling a root predicate data rule to check a status of all core data rules in the rule hierarchy and displaying a failed icon if any one of the rules in the rule hierarchy has failed.

3. A method as in claim 1, further comprising the step of querying the predicate data point regarding whether specific data items exist for the core data rules to operate on and using the predicate rule status when the specific data items do not exist for the core data rule to execute.

4. A method as in claim 1, further comprising the step of suppressing a status icon for a predicate data rule when requested by a user.

5. A method as in claim 4, further comprising the step of disabling rule checking for core data rules of a predicate data rule when requested by an end user.

6. A method as in claim 1, further comprising the step of providing a status icon for a data section header representing the status of a group of core data rules.

7. A method as in claim 1, further comprising the step of displaying an information request icon when the data needed for the core data rules to execute is not available.

8. A system for scaling a storage system containing data points, comprising:
    a plurality of data points having self-contained storage, rendering and updating logic;
    a plurality of databases for storing the plurality of data points;
    a data point catalog containing information about where data points are located the plurality of databases;
    a processing engine for processing data points, wherein the processing engine is configured to retrieve data points from the data point catalog for application; and
    a rule checking engine configured to apply predicate data rules and core data rules for the data points, wherein the predicate data rules check to see if the data used by the core rules is available before allowing the core rules to execute.

9. A system as in claim 8, wherein the rule checking engine displays a non-compliance icon when at least one core rule in a rule hierarchy is not satisfied.

10. A system as in claim 8, wherein the rule checking engine provides an information request icon when the data needed for the core data rules to execute is not available.

11. A method for informing business management personnel of business risk, comprising the steps of:
    defining a plurality of business data rules that are tied to specific risk events and information;
    storing the plurality of business data rules in encapsulated data points in a database;
    defining predicate data rules and core data rules for the business data rules in the data points;

querying with a processing engine whether predicate data rules in a section of data points are satisfied using the predicate data rule in a core data point;

applying core data rules for the core data points using a rule checking engine after predicate data rules for the core data rules have been satisfied; and displaying a graphic icon for a status to an end user representing whether the core data rules in a rule hierarchy have been satisfied.

12. A method as in claim 11, further comprising the step of reporting the core data rule status to the predicate data point and displaying a failure icon when any of the core data rules or the predicate data rule have not been satisfied.

13. A method as in claim 11, further comprising the step of querying using the predicate data rule regarding whether specific data items exist for core data rules to operate on and deactivating core data rule execution when the specific data items do not exist.

14. A method as in claim 11, further comprising the step of using predicate rules to determine whether all needed data is available for a core data rule to execute.

15. A method as in claim 11, further comprising the step of enabling a root predicate data rule to check the status of all dependent core data rules in a tree hierarchy and displaying a failed icon if any one of the icons in the tree hierarchy has been set to failure status.

16. A method as in claim 11, further comprising the step of applying a setting to a rule to stop a rule failure from being passed up to a root node.

17. A method as in claim 11, further comprising the step of grouping data points based on defined areas of risk.

18. A method for informing business management personnel of business risk, comprising the steps of:

defining a plurality of business data rules that are tied to specific risk events and information;

storing the plurality of business data rules in encapsulated data points in a database;

defining predicate data rules and core data rules for the business data rules in the data points;

querying with a processing engine whether predicate data rules in a section of data points are satisfied based on the predicate data rule for a core data point;

applying core data rules for the core data points using a rule checking engine only after predicate data rules for the core data rules have been satisfied;

displaying a graphic icon for a status to an end user representing whether the core data rules in a rule hierarchy have been satisfied; and enabling an end customer to disable core data rules and predicate data rules for a defined business entity to which core data rules are applied.

19. A method as in claim 18, wherein the disabling of any core data rules will trigger the disabling of predicate data rules in the rule hierarchy.

20. A method as in claim 18, further comprising the step of enabling each core data rule to have an alternate core data rule that can be executed depending on the outcome of a predicate data rule.

21. A method as in claim 18, further comprising the step of resetting all rule overrides when a re-calculation of the data point occurs.

22. A method as in claim 21, wherein the recalculation of the rules in a data point includes a cascading re-calculation of all predicate data rules and core data rules.

* * * * *